Patented Sept. 4, 1951

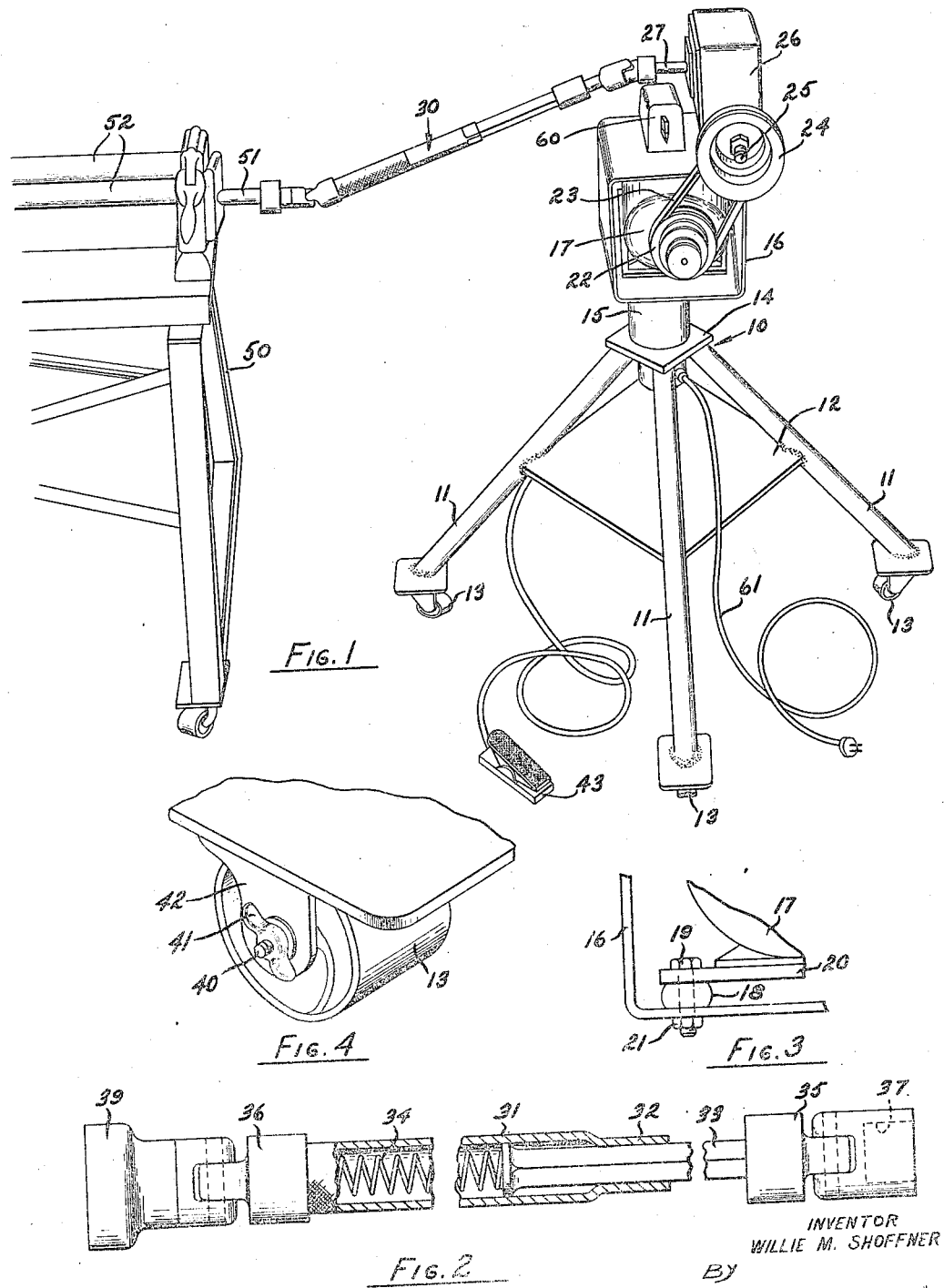

2,567,128

UNITED STATES PATENT OFFICE 2,567,128

PORTABLE POWER UNIT

Willie M. Shoffner, Dayton, Ohio

Application April 6, 1948, Serial No. 19,262

3 Claims. (Cl. 74—16)

This invention relates to a portable power unit and particularly relates to a power unit that is capable of transmitting a high torque at low speed with the advantages of a flexible shaft arrangement but without its disadvantages.

The extensive use of flexible shafts for driving devices from a power unit is well known. However, the transmission shafts of the flexible variety known in the art have definite disadvantages. This is brought about by the fact that the flexible shafts are composed of a wound spring core upon which there is a definite limit of torque that can be applied without causing unwinding of the spring. Also, the usual spring-wound flexible shaft cannot be rotated in opposite directions of rotation for transmitting power unless a double-spring core wound reversely is provided, and this leads to bulky and expensive transmission shafts.

Further, to transmit torque of a high value through a flexible transmission shaft of the spring-wound variety, it is necessary that the flexible shafts be extremely large and expensive.

The object of this invention is to provide a portable power unit that is capable of producing a high torque at low shaft speeds that will have all of the advantages of the flexible shaft, and more, without the disadvantages.

It is still another object of the invention to provide a portable power unit for transmitting a high torque at low shaft speed which is capable of being moved about from place to place so that it can be used with various machines.

Also, it is an object to construct the portable power unit in such a manner that it can become a fixed unit alongside a machine that it is to drive, the transmission shaft between the power unit and the machine being resiliently held against the drive shaft of the machine to provide the driving connection between the power unit and the machine.

Further objects and advantages will become apparent from the drawings and the following description.

In the drawings:

Figure 1 is a perspective elevational view of the power unit of this invention shown in driving connection with a machine.

Figure 2 is a cross-sectional view of a transmission shaft for use in this invention.

Figure 3 is a small elevational view of a portion of the power unit showing the means for mounting the motor.

Figure 4 is an elevational view of one of the rollers of the portable power unit illustrating the means for locking the rollers.

In this invention the power unit 10 consists of a plurality of legs 11 which may be arranged in any suitable fashion. The legs are braced by a plate 12. At the end of each leg 11 there is provided a roller 13 which allows the pedestal to be moved from place to place over a floor so that it can be positioned alongside of any one of a number of machines.

The legs 11 of the pedestal are secured to a plate 14 on which there is positioned a column 15. The column 15 supports the box-like frame 16 in which the electric motor 17 is supported. The electric motor 17 is supported upon the frame 16 by means of resilient, rubber-like grommets 18, a bolt 19 extending through the motor base 20 and the frame 16. Adjustment of the nut 21 provides for upward and downward adjustment of the motor 17 relative to the frame 16.

The motor 17 is provided with a multiple-step pulley 22 that is connected by a belt 23 through a similar multiple-step pulley 24 mounted on the input shaft 25 of a speed-reducing device 26. The speed reducing device 26 has an output shaft 27 that will rotate at a speed much less than that of the drive-shaft of the motor 17.

A resiliently extensible telescoping transversely rigid transmission shaft 30 is connected to the output shaft 27 of the speed-reducing device 26. This transmission shaft 30 consists of a sleeve 31 that has a square portion 32 at one end thereof which receives a square shaft 33. A compression spring 34 is positioned between the end of the shaft 33 and the left-hand end of the sleeve 31 to urge the sleeve 32 and the shaft 33 away from one another, and thus extend the length of the drive shaft.

The square shaft 33 has a universal joint 35 connected to the extending end thereof and the sleeve 31 has a universal joint 36 attached to it. The universal joint 35 is provided with a recess 37 to receive the shaft 27 of the speed-reducing device 26, and to which it is secured. The universal joint 36 includes a socket 39 that has a hollow interior adapted to connect with a square end of a shaft or a hexagonal end to drive the shaft received.

The rollers 13 of the pedestal 10 are provided with a threaded spindle 40 having a wing-nut 41 thereon. Tightening of the wing-nut against the supporting ears 42 prevents the rollers from rotating, thus providing means to lock the pedestal against frictional movement across a floor.

The electric motor 17 is electrically reversible, and to this extent is a conventional type of motor and is adapted to be controlled in its direction of rotation by a toe-and-heel control 43 which in one position of the control rotates the motor clockwise and in the other position of the control operates the motor counter-clockwise, that is, it controls the direction of flow of current to the electric motor to obtain this operation.

The portable power unit is adapted to be moved alongside of any machine that has a drive-shaft extending from it, such as the sheet metal working machine 50 having the drive shaft 51 extending from it which operates the rolls 52. With the portable power unit placed alongside the machine 50 the socket 39 is placed over the end of the drive-shaft 51. The resiliently extensible telescoping transmission shaft 30 will resiliently hold the coupling 39 placed over the end of the drive-shaft 51. The resiliently extensible telescoping transmission shaft 30 will resiliently hold the coupling 39 upon the end of the drive-shaft 51 of the machine 50 when the rollers 13 on the pedestal are locked against rotation by tightening of the wingnuts 41.

Since the transmission shaft 30 is provided with universal joints at opposite ends thereof, it can be used much the same as the conventional flexible shafts, but since the transmission shaft is transversely rigid it forms a positive drive to the machine 50 from the power unit 10, and since the transmission shaft is transversely rigid, it is capable of transmitting a high torque at low shaft speeds.

The transmission shaft 30 is more particularly disclosed and described in my copending application, Serial No. 781,961, filed October 24, 1947.

A usual on-and-off control switch 60 is provided for the electric motor 17, and a suitable extension cord 61 is also provided.

While the apparatus disclosed and described herein constitutes a preferred form of the invention, yet the construction of it can be modified without departing from the spirit of the invention, and all modifications that fall within the scope of the appended claims are intended to be included herein.

Having thus fully described my invention, what I claim as new and desire to secure by Letters Patent is:

1. A low speed high torque portable power unit for removable connection to non-power operated machines whereby to power drive the same at the will of an operator consisting of, a multiple-legged pedestal, a post extending upwardly from said pedestal, a box frame carried on said post, a prime mover carried within said frame and supported thereby, a speed reducer carried on the top of said frame and supported thereby and having a drive shaft extending therefrom, means forming a flexible driving connection between said prime mover and said speed reducer, a resiliently extensible telescoping transversely rigid transmission shaft having a universal joint at each end thereof, one of said universal joints being connected to said drive shaft of said speed reducer, the other of said universal joints including means for removably connecting the same to a machine to power drive the same, and means on said pedestal locking same from movement over the floor, whereby to hold said pedestal stationary against movement urged by resilient extension of said transmission shaft when in operative driving connection with a machine to be driven thereby.

2. A low speed high torque portable power unit for removable connection to non-power operated machines whereby to power drive the same at the will of an operator consisting of, a multiple-legged pedestal, a post extending upwardly from said pedestal, a box frame carried on said post, a prime mover carried within said frame and supported thereby, a speed reducer carried on the top of said frame and supported thereby and having a drive shaft extending therefrom, a stepped pulley and belt arrangement drivingly connecting said prime mover with said speed reducer, a resiliently extensible telescoping transversely rigid transmission shaft having a universal joint at each end thereof, one of said universal joints being connected to said drive shaft of said speed reducer, the other of said universal joints including means for removably connecting the same to a machine to power drive the same, and means on said pedestal locking same from movement over the floor, whereby to hold said pedestal stationary against movement urged by resilient extension of said transmission shaft when in operative driving connection with a machine to be driven thereby.

3. A low speed high torque portable power unit for removable connection to non-power operated machines whereby to power drive the same at the will of an operator consisting of, a pedestal of substantially pyramidal shape having a plurality of individual floor contacting areas for maintaining stability of the pedestal on a floor, a supporting box frame carried on the apex of said pedestal, an electric motor supported within said frame, a speed reducer supported on the top of said frame and having a drive shaft extending therefrom, means forming a flexible driving connection between said motor and said speed reducer, a resiliently extensible telescoping transversely rigid transmission shaft having a universal joint at each end thereof, one of said universal joints being connected to said drive shaft of said speed reducer, the other of said universal joints including means for remotely connecting the same to a machine to power drive the same, and means on said pedestal locking same from movement over the floor, whereby to hold said pedestal stationary against movement urged by resilient extension of said transmission shaft when in operative driving connection with a machine to be driven thereby.

WILLIE M. SHOFFNER.

REFERENCES CITED

The following references are of record in the file of this patent:

UNITED STATES PATENTS

| Number | Name | Date |
|---|---|---|
| 46,478 | Lanback | Feb. 21, 1865 |
| 116,885 | Tally et al. | July 11, 1871 |
| 480,040 | Saylor | Aug. 2, 1892 |
| 773,930 | Duncan | Nov. 1, 1904 |
| 1,044,423 | Rosa | Nov. 12, 1912 |
| 1,151,966 | Powell | Aug. 31, 1915 |
| 1,219,545 | Gilbertson | Mar. 20, 1917 |
| 1,438,702 | Flach | Dec. 12, 1922 |
| 1,771,629 | Hoe | July 29, 1930 |
| 1,790,584 | Hirschy | Jan. 27, 1931 |
| 2,097,729 | Mall | Nov. 2, 1937 |
| 2,368,731 | Snyder et al. | Feb. 6, 1945 |

FOREIGN PATENTS

| Number | Country | Date |
|---|---|---|
| 674,428 | France | Jan. 28, 1930 |